Nov. 12, 1957 J. STUART II 2,812,790
PREPARATION OF SHREDDED WOOD PULP
Filed Oct. 4, 1954 2 Sheets-Sheet 1

JOSEPH STUART II
INVENTOR.

BY *Ernest G. Peterson*

AGENT

Nov. 12, 1957   J. STUART II   2,812,790
PREPARATION OF SHREDDED WOOD PULP
Filed Oct. 4, 1954   2 Sheets-Sheet 2

JOSEPH STUART II
INVENTOR.

BY Ernest G. Peterson
AGENT

United States Patent Office 2,812,790
Patented Nov. 12, 1957

2,812,790

PREPARATION OF SHREDDED WOOD PULP

Joseph Stuart II, Wilmington, Del., assignor to Hercules Powder Company, Wilmington, Del., a corporation of Delaware Application October 4, 1954, Serial No. 460,181

2 Claims. (Cl. 144—309)

This invention relates to the preparation of shredded wood pulp and particularly to a method and apparatus for the production of wood pulp particles suitable for use in the manufacture of cellulose derivatives.

Uniform chemical reaction of wood pulp with economy comparable to that obtained in the chemical reaction of cotton has been the object of considerable research for many years. Thus, for example, U. S. Patent 2,028,080 issued in 1936 to Raphael L. Stern disclosed a wood pulp product and its method of preparation which has met with wide commercial and military success. From the commercial viewpoint, it was found that the product contributed to and made possible the manufacture of cellulose derivatives from wood pulp which were comparable to those obtained from cotton. While the esters, such as soluble nitrocellulose and cellulose acetate, and the mixed esters, such as cellulose acetobutyrate, were outstanding products, a most remarkable contribution to the art by the Stern invention was realized in its successful application to the manufacture of smokeless nitrocellulose for military purposes. Vast quantities of smokeless nitrocellulose have been manufactured for military purposes since issuance of the Stern patent and are still so manufactured.

It has been found that although the Stern product approaches the ideal form for subsequent chemical treatment from a chemical and physical viewpoint, it is difficult to obtain the product from certain types of wood pulp sheet. Moreover, it is quite important to have a wide selection of chemical cellulose for increasing commercial demand and more particularrly for large volume military demand in the event of military emergency. However, as previously mentioned, it is difficult to obtain a suitable particle from some pulps and when this condition exists uniform reaction is extremely difficult to obtain, excessive amount of reactant must be employed, and an excessive length of time is required for reaction. For example, this problem is extremely acute where it is necessary to convert generally obtainable sulfate pulp into a form suitable for producing acceptable military nitrocellulose.

Therefore, the primary object of this invention is to provide a method and apparatus for converting generally obtainable wood pulp into a form suitable for use in the manufacture of cellulose derivatives and more particularly for the production of military nitrocellulose.

Other objects of the invention will appear hereinafter, the novel features and combinations being set forth in the appended claims.

In accordance with this invention, there is provided a method and apparatus for producing wood pulp in a form adapting it for chemical reaction, and particularly nitration, wherein a sheet of felted wood pulp is sheared and split in an inclined position. In a more specific aspect, the shearing and splitting of the pulp is conducted at an inclined angle while passing cooling medium, such as air, to the immediate vicinity of each of the particles being formed.

One embodiment of the invention is presented herein for the purpose of illustration but it will, of course, be understood that the invention is susceptible to different modified embodiments which come within the scope of the appended claims.

In the accompanying drawings, which form a part of the specification, and wherein reference symbols refer to like parts wherever they occur:

Figure 1:
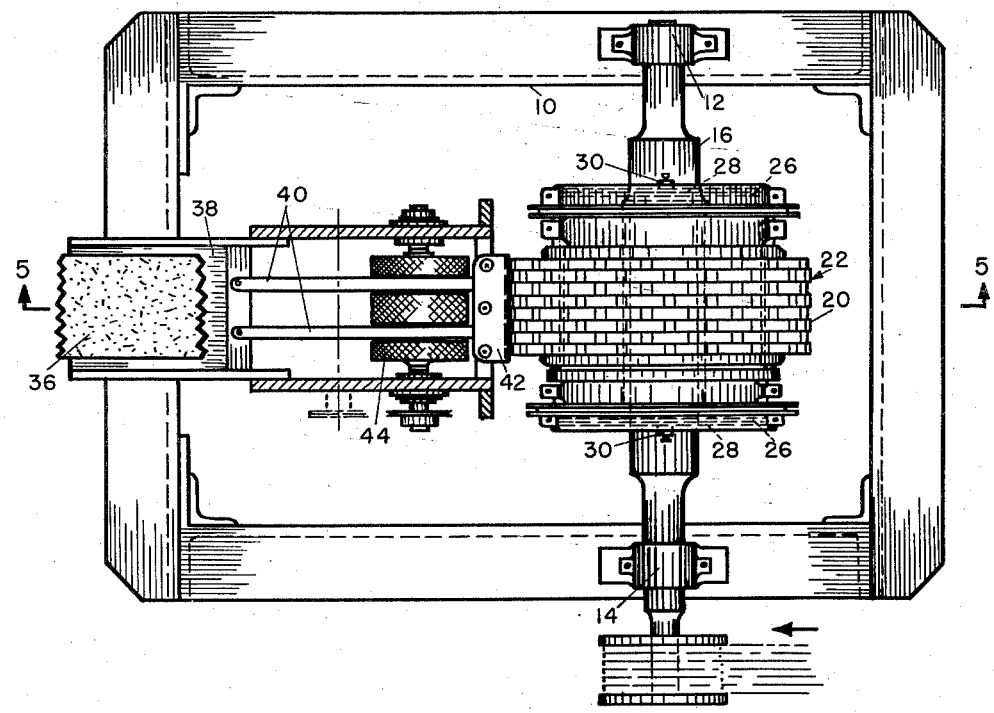
Fig. 1 is a plan view of one form of apparatus for embodiment of the invention with the casing and certain parts removed for clearly showing the cutter head and associated parts.
Figure 2:
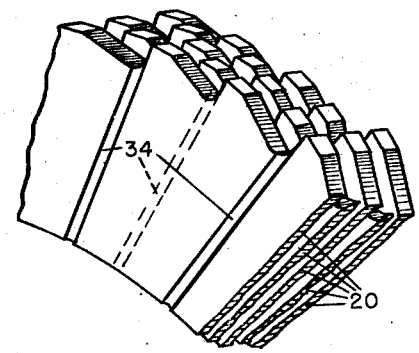
Fig. 2 is an enlarged fragmentary, isometric view showing the staggered relationship of the radial cutting edges and cooling slots of the cutter head.

Referring now to the drawings in detail, a frame represented by 10 is provided with journals 12 and 14 which support a driven shaft 16. The driven shaft 16 has a perforated arbor 18 which is concentric therewith and secured thereto. A plurality of circular sawlike cutter tooth elements 20 arranged in staggered relationship fit over the arbor 18 and are securely affixed in place so that the elements 20 in conjunction with the arbor 18 and the shaft 16 form a rotatable cylindrical cutter head assembly represented by 22. The cutter head assembly 22 is enclosed by a casing 24 which is affixed to the frame 10. The casing 24 is provided with slotted damper screens 26 at each end of the arbor 18 for passage of atmospheric air into the interior of the arbor. The amount of air which passes into the interior of the arbor 18 is controlled by slotted damper members 28 rotatably fitted against the screens 26. The members 28 have levers 30 for rotative adjustment whereby the screens 26 and damper members 28 may be adjusted for complete registry and maximum air or may be adjusted for incomplete registry for controlled amount of air or down to no registry at which point the air entering through the arbor is cut off. The interior of the arbor 18 is provided with a plurality of fan blades, represented by 32, which assist the centrifugal action of the rotating cutter head in forcing air through the perforated arbor 18 and then through a plurality of slots or grooves, represented by 34, which are provided in the sawlike elements 20. The cutting edge 20a of the elements 20 is provided with sufficient free space so that the sheared shreds will not choke the cutter. Cooling air, through the grooves 34 which emanate in juxtaposition to the cutting edges, further assists to prevent choking of the cutter.

Wood pulp sheet 36 passes over a guide plate 38 and support members 40 which extend from the guide plate to a shearing anvil or bedknife 42. A bottom feed roll 44 is driven by variable speed driving means and cooperates with a top idler roll 46 having adjustable pressure springs 48 associated therewith for properly feeding the sheet 36 to the cutter head 22. The feed roll 44 has a knurled surface to insure positive feed and it is grooved so that the support members 40 pass through the grooves below the "bite" area between the rolls 44 and 46. A hold plate 50 is provided above the anvil 42 in spaced relationship thereto and is provided with extending fingers or guides 50a which extend through grooves provided in roll 46. These fingers or guides pass through the grooves in roll 46 above the "bite" area between the rolls 44 and 46. The sheet 36 is slidably fed at an inclined angle by the rolls 44 and 46 through the space provided between the anvil 42 and the hold plate 50 into contact with the cutter head 22. Ancillary features for convenience of operation include a sight-glass 52 provided in the casing 24 and shaping of the casing to lead the wood pulp particles formed into a suitable receptacle 54. The entire feeding and chipping mechanism of the apparatus is suitably enclosed by extension of the casing 24 thereabout to insure safety as well as adequate control of cooling air and particle removal.

An example of the operation of the invention is given for processing tough sulfate wood pulp where equipment heretofore available was found deficient for producing particles under suitable capacity conditions which upon nitration gave acceptable military nitrocellulose. For this purpose, variations of method and apparatus were employed such as cutter tooth width, saw element arrangement, speed of cutter head, angle of wood pulp feed, feed rate, and number of teeth on the saw elements. Three bleached sulfate wood pulp stocks classified as "tough" stocks were prepared in 5¼ inch wide rolls. One sample of each pulp was shredded under a set of different shredding conditions. Shredding was evaluated from the appearance of the shreds and by nitration of the shredded samples in high grade smokeless nitrating acid. Based on a series of runs, the following significant chemical data were obtained: Nitrogen contents averaged 0.02 percent higher from feeding the sheets 5 degrees upward (inclined) from the horizontal as compared with horizontal feed and feeding 5 degrees downward resulted in nitrogen contents averaging 0.02 percent lower. Moreover, it was found that ¾ inch length shreds or particles nitrated to an average of 0.03 percent higher nitrogen than shreds of lesser length with other conditions held constant. As a result of tests on sulfite and sulfate pulps, it was found that the primary object of this invention relative to generally obtainable wood pulp was accomplished under the following preferred conditions: Rotor speed 2400 R. P. M.; twenty teeth per circumference (18⅝ inch diameter); pulp feed 100 ft. per min.; pulp feed angle 5° inclined from horizontal; tooth width ¾ inch; clearance between bedknife and cutting teeth 0.008 inch; tooth arrangement staggered and controlled air for cooling the cutters.

Generally, the inclined angle for shearing the sheet may be varied slightly from about 3 to about 7 degrees and although the preferred gaseous medium for cooling is air, an inert gas such as nitrogen to repress degradation at increased temperature may be used and the use of such medium is considered within the purview of this invention.

Wood pulp in the form contemplated by this invention may be of any type desirable for intended chemical treatment. Thus, for example, the wood pulp may have an α-cellulose content of 88%, 95%, or such other percentage as may be suitable or desired for cellulose derivative manufacture. The wood pulp may be bleached to a high white or to any less degree which may be satisfactory for the purpose for which the ultimate end product is intended.

The sheet from which the particles contemplated by this invention will be formed may be any suitable commercial form of felted pulp. The sheet may be of any width, depending upon the capacity of the apparatus designed to cut off the lengths contemplated. The sheet may be of a thickness within quite wide limits, say from 0.03 to 0.06 inch.

Desirably, by way of illustration and not by way of limitation, a sheet of lightly felted or tough wood pulp, having a thickness of .030 inch and a width suitable to the apparatus to be used, will be found satisfactory for the production of the pulp. For example, where the lengths contemplated by this invention are formed from a sheet having a thickness of .030 inch and the sheet is fed under the preferred conditions hereinbefore set forth, the particles will have a length of about ¾ inch, a width of about 0.25 inch, and a thickness of about .010 inch.

The particles set forth above having a length of about ¾ inch and a width of about .025 inch and a thickness of about .010 inch will be formed by the cutting of 0.025 inch widths of a length of ¾ inch from the sheet and splitting the lengths lengthwise into three pieces. The particles thus formed will be threadlike or ribbonlike, depending upon their width. This is more readily seen by reference to Fig. 3 and Fig. 4 of the drawings.

Figure 3:
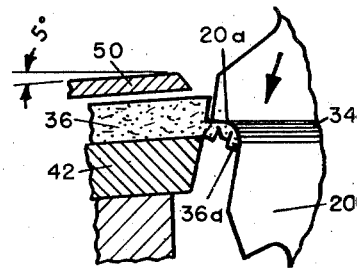
Fig. 3 is an enlarged fragmentary, sectional view showing the shearing and splitting action of a radial cutting edge as it engages the wood pulp sheet.
Figure 4:
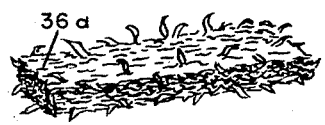
Fig. 4 is an enlarged, isometric view of a wood pulp particle.
Figure 5:
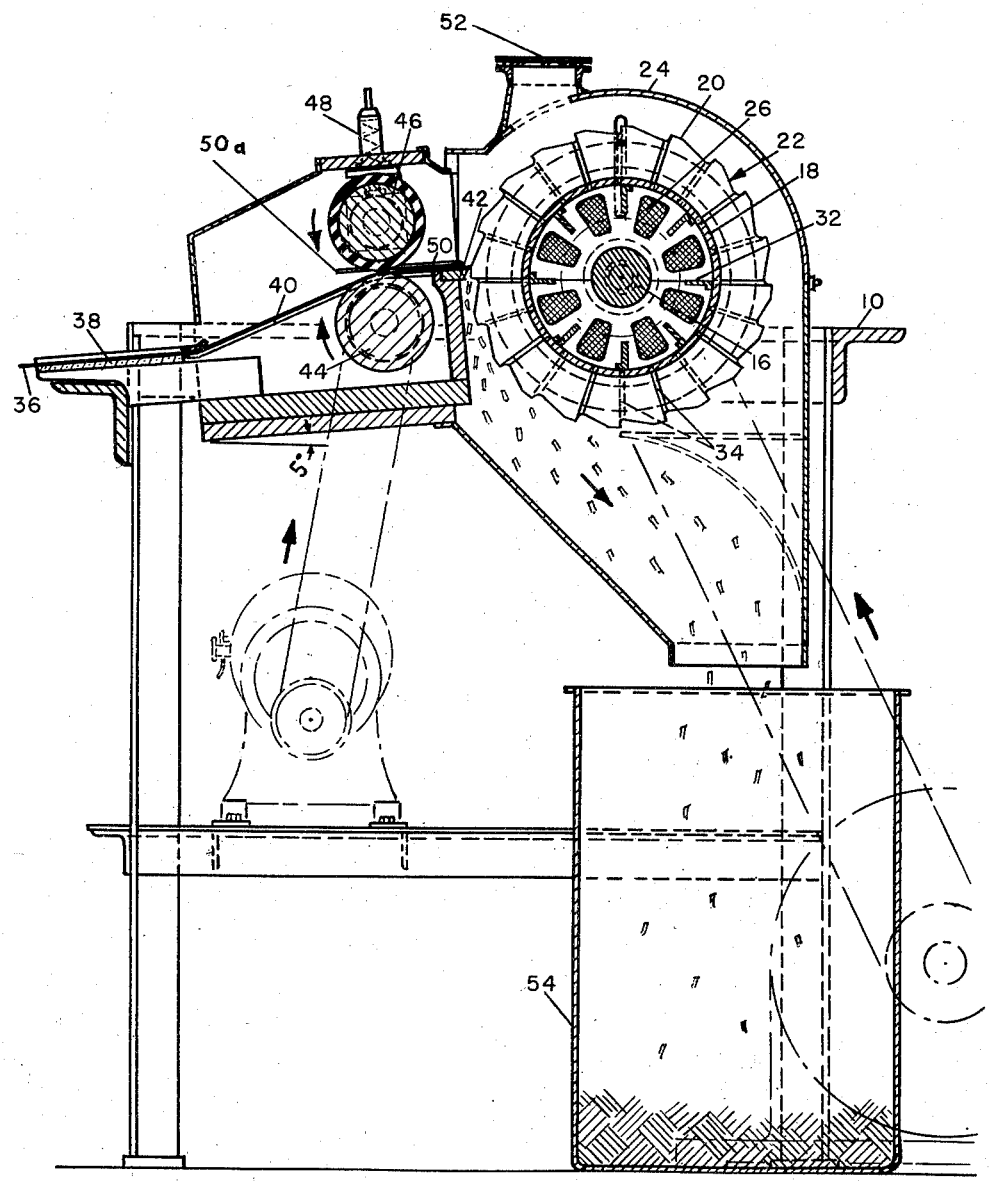
Fig. 5 is a sectional view taken on line 5—5 of Fig. 1 with certain parts in place for clearly showing complete operation of the invention.

With reference to Fig. 3 and Fig. 4, assuming, in line with the example given above, that lengths having a width of about .025 inch are to be cut from the sheet 36, it will be noted that as the cutting edge 20a of the cutter tooth elements 20 penetrates the sheet, the under side of the body portion of the cutter elements cooled by air slots 34 causes the severed portion of the sheet to be bent outwardly and downwardly, thus splitting the lengths into sections as they are severed. In this respect, it will be noted that the cooling means emanates in juxtaposition to the radial cutting edges of the elements 20. This prevents degradation of the sheet by preventing overheating of the cutter elements, reduces wear on the cutter blades by keeping them at a lower operating temperature, and keeps the cutter head clean by blowing the pulp shreds outward away from the teeth. Furthermore, it will be appreciated, in reference to the example wherein a sheet having a thickness of .030 inch is split into three thicknesses of about .010 inch, that due to the high speed and angular impact of this invention that the shreds are essentially "exploded" into particles of much lower density than the original sheet from which they are sheared. Thus, the shreds are split into three or more particles and usually many depending on the toughness of the sheet and operating conditions as hereinbefore described.

The splitting of the lengths causes their upper and lower surfaces to be substantially irregular or rough, with protruding fibers. Their side edges are substantially irregular or rough due to the end tearing as well as shearing action of the cutting edge 20a. The end faces of the lengths are irregular and rough with protruding fibers due to the fact that the lengths are torn rather than cut from the sheet at their ends, since the cutting edges of the cutter elements 20 are staggered with respect to one another rather than aligned. More particularly, Fig. 4 shows a typical particle of wood fiber 36a contemplated by this invention and having the characteristics described above. With reference to Fig. 4, which is considerably magnified, the nature of the particles will be noted. Here, it will be seen that the surfaces and ends of the particle are irregular and have protruding fibers and that the fibers lie or are felted together lightly. Moreover, by the procedure for their formation, involving shearing, splitting and tearing, the particles are rendered less dense than the sheet from which they are formed. In this respect, the particles are characterized by the fact that they are formed by splitting in connection with shearing from the sheet and that the particles are considerably less dense than the sheet from which they are formed, even when the starting material is a tough, dense wood pulp sheet.

Wood pulp particles in the form contemplated by this invention, as described in detail above in connection with a description of illustrative method and apparatus for its formation from a variety of stocks including tough and dense stock, will be found suitable for chemical reaction and particularly nitration. The particles will be readily penetrated by the nitrating mixture and may be readily nitrated with a nitrating mixture comparable from the standpoint of economy with that used for the nitration of cotton. As illustrative, the particles may be nitrated uniformly with no excessive time requirement, by utilizing a nitrating mixture comprising 28% nitric acid and 55% sulfuric acid and 17% of water and the particles may be nitrated in the usual apparatus used for nitrating cotton. In accordance with the invention, particles formed from a variety of commercial wood pulp sheets will not mat and form dense masses in the nitrating apparatus or in the subsequent operations of stabilizing and dehydrating in which operations it may be handled with the same facility as in the case of nitrated cotton.

It will be understood that the particles produced in accordance with the method and apparatus of this invention may be varied considerably in respect to formation and dimension and that the optimum and preferred conditions are set forth. This is more readily appreciated in realizing that the particles in a given mass will vary substantially in dimensions even when produced with a given apparatus from a sheet of given thickness, due to the fact that variously the particle lengths in their formation will split into more or less than the three sections as herein described for illustrative purposes.

It will be further appreciated that while for illustrative purposes the wood pulp particles contemplated by this invention have been more particularly described as adapted for nitration, their adaptability for various chemical treatment for the production of cellulose derivatives is contemplated.

What I claim and desire to protect by Letters Patent is:

1. A method of producing wood pulp particles suitable for chemical reaction which comprises feeding a supported sheet of felted wood pulp at an inclined angle to flat surfaced radial cutting edges in staggered relationship forming the peripheral surface of a rotary cylindrical cutter head, said inclined angle of feed being between about 3° and about 7° relative to horizontal, subjecting said supported sheet to shear at said inclined angle of feed, tearing the pulp thus sheared from the sheet in longitudinal sections, and splitting the longitudinal sections lengthwise as they are sheared to form longitudinal discrete particles of less thickness than the thickness of the original sheet of felted wood pulp.

2. A method of producing wood pulp particles suitable for chemical reaction which comprises continuously feeding a supported sheet of felted wood pulp at an inclined angle to flat surfaced radial cutting edges in staggered relationship forming the peripheral surface of a rotary cylindrical cutter head, said inclined angle of feed being between about 3° and about 7° relative to horizontal, subjecting said supported sheet to shear at said inclined angle of feed, tearing the pulp thus sheared from the sheet in longitudinal sections, and splitting the longitudinal sections lengthwise as they are sheared to form longitudinal discrete particles of less thickness than the thickness of the original sheet of felted wood pulp while passing a gaseous cooling medium to the immediate vicinity of each of the particles being formed during shearing and splitting.

References Cited in the file of this patent

UNITED STATES PATENTS

| | | |
|---|---|---|
| 225,292 | Martin | Mar. 9, 1880 |
| 542,075 | Brown | July 2, 1895 |
| 908,720 | Williams | Jan. 5, 1909 |
| 1,220,257 | Molander | Mar. 27, 1917 |
| 1,282,285 | Plank | Oct. 22, 1918 |
| 1,851,390 | Kehoe | Mar. 29, 1932 |
| 1,862,681 | Johnson | June 14, 1932 |
| 2,080,401 | Heard | May 18, 1937 |
| 2,442,492 | Hassler | June 1, 1948 |
| 2,564,551 | Vazieux | Aug. 14, 1951 |
| 2,710,635 | Alexander | June 14, 1955 |